May 28, 1946.　　　　K. V. BAKER　　　　2,400,969
COMBINATION VALVE AND WATER ADAPTER FOR TIRE TUBES
Filed July 20, 1943　　　2 Sheets-Sheet 1

Inventor
Karl V. Baker
By Clarence A. O'Brien
and Harvey B. Jacobson
Attorneys

May 28, 1946. K. V. BAKER 2,400,969
COMBINATION VALVE AND WATER ADAPTER FOR TIRE TUBES
Filed July 20, 1943 2 Sheets-Sheet 2

Inventor
Karl V. Baker
By Clarence A. O'Brien
and Harvey B. Jackson
Attorneys

Patented May 28, 1946

2,400,969

UNITED STATES PATENT OFFICE 2,400,969

COMBINATION VALVE AND WATER ADAPTER
FOR TIRE TUBES

Karl V. Baker, Malaga, Ohio

Application July 20, 1943, Serial No. 495,491

2 Claims. (Cl. 152—415)

My invention relates to combined air valves and water adapters for the tubes of pneumatic tires.

The primary object of the instant invention is to provide an air valve and water adapter for the tubes of trucks, or tractor, tires requiring a laterally projecting valve stem, and which is leak-proof, simplified as regards structure, easy to apply and comparatively inexpensive to manufacture.

Other and subordinate objects are also comprehended by my invention, all of which, together with the precise nature of my improvements and the advantages thereof, will be readily understood when the succeeding description and claims are read with reference to the drawings accompanying and forming part of this specification.

Figure 1:
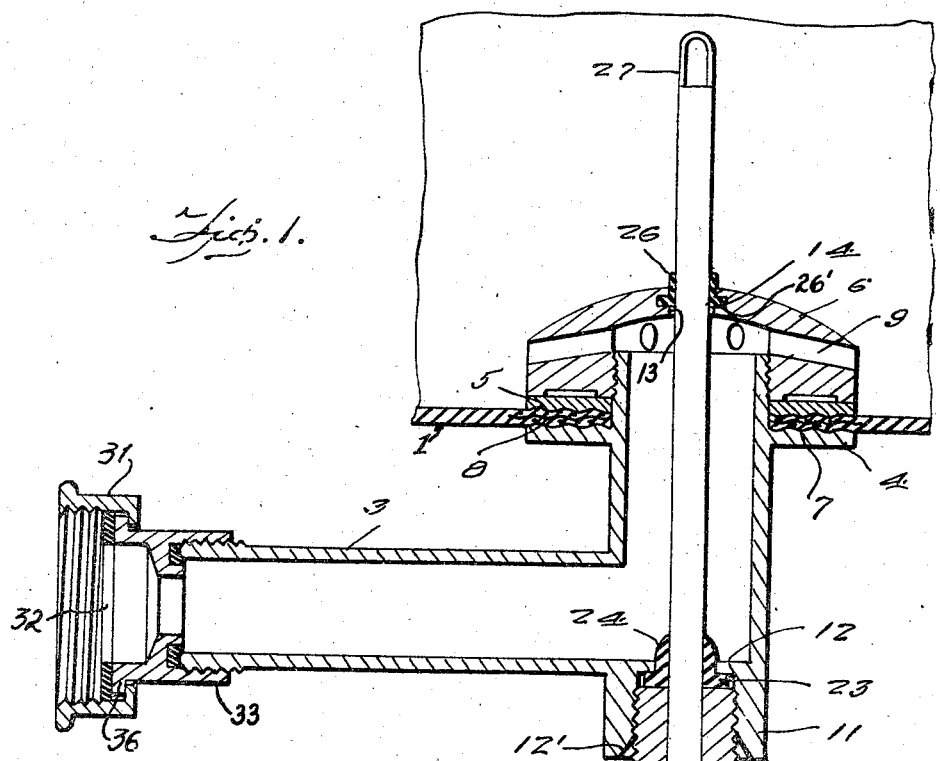
Figure 1 is a view in longitudinal section of my invention showing the same assembled for introducing water into a tire tube.
Figure 2:
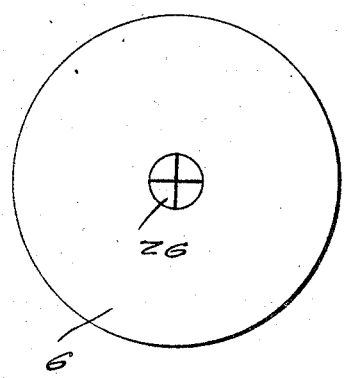
Figure 2 is a view in top plan of the cap nut.
Figure 4:
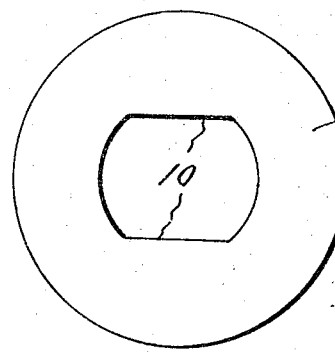
Figure 4 is a view in plan of the washer.
Figure 3:
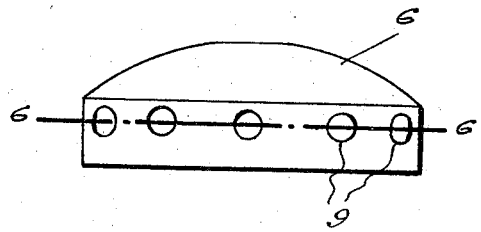
Figure 3 is a view in side elevation of said nut.

Referring to the drawings by numerals, according to the preferred practice of my invention, the tire tube 1 is equipped with a tubular, right angled adapter stem providing a radial section 2, when applied, and a lateral relatively smaller section 3. The adapter stem is secured to the tube 1 by means of a circular, radial, intermediate flange 4 on the section 2 opposed to the outer side of said tube 1, a similar size washer 5 fitting around the section 2 and opposed to the inner side of said tube 1, and a circular crowned cap nut 6 threaded onto the inner end of the section 2, within the tube 1, and turned against the washer 5, so that said washer and said flange 4 clamp the tube 1 therebetween. The flange 4 and washer 5 have serrated faces, as at 7, 8, for crimping the tube 1 between the same to form a tight seal. The cap nut 6, beyond the inner end of the section 2, is provided with radiating ducts 9 establishing communication between the section 2 and the interior of said tube 1. The washer 5 is formed with straight, internal side edges 10 to fit corresponding flat sides, not shown, on the section 2, so that the washer 5 is prevented from turning on said section. The section 2 extends at its outer end beyond the section 3 to provide a nipple 11 which is internally threaded and formed with an internal annular flange 12 at its inner end, and an internal outer end beveled seat 12'. The cap nut 6 is provided in the crown thereof with an axial aperture 13 having an internal grooved edge, as at 14. The purpose of the nipple 11, flange 12 and aperture 13 will presently appear.

An air valve fitting 15 is provided, primarily, for the outer end of the section 3, said fitting having an enlarged inner end cap section 16 threaded onto said outer end of the section 3, a valve section 17, similar to the usual valve stem for tires, and which contains the usual valve insides, not shown, and receives the usual valve stem cap 18. A rubber gasket 19 countersunk in the bottom of the cap section 16 provides for a tight seal between said section and the outer end of the stem section 3.

A threaded plug 20 is provided for closing the nipple 11, said plug having a wrench hold flange 21, and a beveled shoulder 22 fitting in the seat 12', and a flanged rubber gasket 23 for clamping against the flange 12 is provided, said gasket having a dome-like center formed of flaps 24 extending through the flange 12 and adapted to normally close the gasket, while being flexible to open up for a purpose presently apparent.

Figure 5:
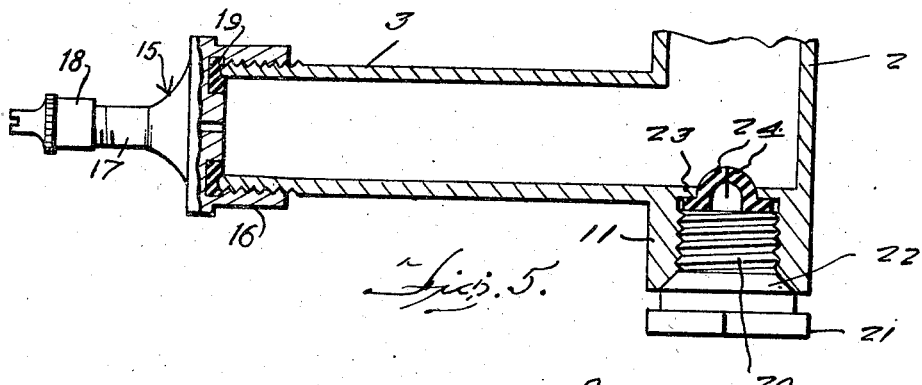
Figure 5 is a fragmentary view in longitudinal section of the adapter stem conditioned for use as an air valve adapter.
Figure 6:
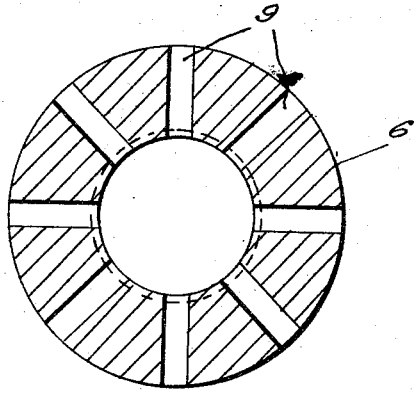
Figure 6 is a view in horizontal section taken on the line 6—6 of Figure 3.

Normally, the invention, as so far described, is designed for use as an air valve adapter as shown in Figure 5, the nipple 11 being closed by the plug 20 and the gasket 23, and air being introduced into the adapter by way of the fitting 15, in the usual manner.

However, the following devices are provided for use in conjunction with the described parts in introducing and discharging water and/or antifreeze into the tube 1 when desired.

An air tube 25, of smaller diameter than the section 2, is adapted to be inserted, with the plug 22 removed, through the nipple 11, gasket 23, and the cap nut 6, by way of the aperture 13, into the tube 1, the gasket 23 forming a seal around the tube 25, at the nipple end of the section 2, and a gasket 26, similar to gasket 23, and with a flange 26', seating in the groove 14 of the aperture 13, forming a seal around said tube 25 at the inner end of said section 2. The tube 25 is provided with a rounded, open sided, inner end 27 for preventing injury to the tube 1 by said inner end of the tube 25. The outer end of the tube 25 is extended through a stuffing gland 28 on an externally threaded coupling 29, and is flanged, as at 30, to retain the stuffing gland thereon. The coupling 29, for reasons presently apparent, is of the same diameter as the outer end of the adapter section 3. An axially bored screw plug 38 slidable on the tube 25 is provided for turning into the nipple 11 around said tube to tighten the gasket 23 against the nipple flange 12 and around the tube 25 so as to form a water-tight seal around said tube 25 preventing the escape of water out of the nipple 11 and section 2.

To introduce water, or other liquid, into the tube 1, the valve fitting 15 is detached, the sleeve 33, with the hose coupling 31 thereon, is attached to the outer end of the adapter section 3 so that a hose line may be coupled to said adapter stem to discharge water under pressure into the tube 1 by way of said adapter stem and the ducts 9 in the cap nut 6. As the water, or other liquid, enters the tube 1, the air in said tube discharges out of the tube 25. When the desired amount of water, or other liquid, has been introduced into the tube 1, the sleeve 33, with coupling 31, is detached from the adapter stem section 3, the valve fitting 15 replaced, the tube 25 withdrawn, the plug 38 removed, and the plug 22 replaced.

To remove water from the tube 1, the adapter stem 2, 3 should be at the bottom of the wheel, the tube 25 is then inserted downwardly, substantially as described previously, the fitting 15 attached to the coupling 29 and connected to an air hose, not shown, so that air under pressure may be introduced into the tube 1 by way of the tube 25, thereby forcing the water, or other liquid, out of said tube 1 by way of the ducts 9 and the adapter stem sections 2, 3.

The foregoing will, it is believed, suffice to impart a clear understanding of my invention without further explanation.

Manifestly, the invention, as described, is susceptible of modification without departing from the inventive concept, and right is herein reserved to such modifications as fall within the scope of the appended claims.

What I claim is:

1. A combined air valve and water adapter for attachment to a tire tube comprising a tubular, right angled adapter stem forming, when attached, a radial section and a lateral section having a threaded outer end, means to attach one end of the radial section to said tube in communication therewith comprising a cap nut having outlet ducts therein extending through the sides thereof, said cap also having an axial opening therein, an axial nipple at the other end of said radial section communicating therewith, a relatively smaller diameter tube extended axially through said radial section, and opening into said tube said tube having an outer end projecting out of said nipple, a pair of resilient gaskets in said nipple and opening through which said tube is slidably extended for removal, said gaskets embodying self-closing flaps permitting extension of the tube through the gaskets, an externally threaded collar on the outer end of said tube of the same diameter as the threaded end of said lateral section, and a hose coupling attachable to the threaded outer end of the lateral section and said collar selectively.

2. A combined air valve and water adapter for attachment to a tire tube comprising a tubular, right angled adapter stem forming, when attached, a radial section and a lateral section having a threaded outer end, means to attach one end of the radial section to said tube in communication therewith comprising a cap nut having outlet ducts therein extending through the sides thereof, said cap also having an axial opening therein, an axial nipple at the other end of said radial section communicating therewith, a relatively smaller diameter tube extended axially through said radial section, and opening into said tube said tube having an outer end projecting out of said nipple, a pair of resilient gaskets in said nipple and opening through which said tube is slidably extended for removal, gaskets embodying self-closing flaps permitting extension of the tube through the gaskets, an externally threaded collar on said outer end of said tube of the same diameter as the threaded outer end of said section, a hose coupling attachable to the threaded outer end of the lateral section and said collar, selectively, and an air valve attachable to the outer end of said tube when said coupling is attached to said outer end of said lateral section.

KARL V. BAKER.